(12) United States Patent
Wada

(10) Patent No.: US 11,316,719 B2
(45) Date of Patent: Apr. 26, 2022

(54) TRANSMITTING APPARATUS, RECEIVING APPARATUS, AND TRANSMITTING-RECEIVING SYSTEM

(71) Applicant: Audio-Technica Corporation, Tokyo (JP)

(72) Inventor: Ariisa Wada, Tokyo (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 0 days.

(21) Appl. No.: 17/232,720

(22) Filed: Apr. 16, 2021

(65) Prior Publication Data

US 2021/0336823 A1 Oct. 28, 2021

(30) Foreign Application Priority Data

Apr. 27, 2020 (JP) .............................. JP2020-078173

(51) Int. Cl.
| | |
|---|---|
| *H04L 27/10* | (2006.01) |
| *H04L 27/01* | (2006.01) |
| *H04B 1/02* | (2006.01) |
| *H04B 1/06* | (2006.01) |

(52) U.S. Cl.
CPC .............. *H04L 27/10* (2013.01); *H04B 1/02* (2013.01); *H04B 1/06* (2013.01); *H04L 27/01* (2013.01)

(58) Field of Classification Search
CPC .. H04B 1/02; H04B 1/06; H04L 27/01; H04L 27/10
See application file for complete search history.

(56) References Cited

U.S. PATENT DOCUMENTS

| | | | |
|---|---|---|---|
| 5,237,288 A * | 8/1993 | Cleveland ................. | H03F 1/34 330/107 |
| 2009/0281800 A1* | 11/2009 | LeBlanc ............. | G10L 21/0208 704/224 |
| 2009/0287496 A1* | 11/2009 | Thyssen ................. | H03G 7/007 704/500 |

FOREIGN PATENT DOCUMENTS

JP 2015-019146 A 1/2015

* cited by examiner

*Primary Examiner* — David S Huang
(74) *Attorney, Agent, or Firm* — WC&F IP

(57) ABSTRACT

A transmitting apparatus, a receiving apparatus corresponding to the transmitting apparatus, and a transmitting-receiving system including: a first A/D converting part that converts an analog audio signal into a digital signal; a compressing part that compresses the converted digital signal; a modulating part that generates a modulated signal by modulating the compressed digital signal; an all-pass filter that reduces a phase distortion included in the modulated signal; and a transmitting part that transmits a phase-distortion-cancelled signal resulting from reducing the phase distortion of the modulated signal with the all-pass filter are provided.

8 Claims, 3 Drawing Sheets

TRANSMITTING APPARATUS, RECEIVING APPARATUS, AND TRANSMITTING-RECEIVING SYSTEM

CROSS-REFERENCE TO RELATED APPLICATIONS

The present application claims priority to Japanese Patent Application Number 2020-078173, filed on Apr. 27, 2020. The contents of this application are incorporated herein by reference in their entirety.

BACKGROUND

A transmitting-receiving system that transmits a compressed signal, which is an audio signal that has been compressed, and restores the audio signal by expanding the received compressed signal is known (for example, see Patent Document 1, Japanese Unexamined Patent Application Publication No 2015-19146). Also, it is known that processing such as pre-emphasis, compression, or the like is performed in analog communication as well. However, it is difficult to accurately perform such processing on the analog signal as is because of performance degradation due to variations in parts, wiring, temperature changes, or the like. Therefore, there is a known method in which wireless transmission is carried out by converting an analog signal into a digital signal and then performing pre-emphasis, compression, or the like on the digital signal, and then reconverting the digital signal into the analog signal.

Such a transmitting-receiving system may transmit and receive a modulated signal which is a compressed signal that has been modulated. In this case, there was an issue where a phase of the compressed signal became non-linear in modulation and demodulation, or the like, and therefore the expanded audio signal was distorted.

SUMMARY

The present disclosure focuses on this point, and its object is to suppress a distortion that occurs in an audio signal in the transmitting-receiving system that transmits and receives the audio signal by performing modulation and demodulation.

A first aspect of the present disclosure provides a transmitting apparatus including: a first A/D converting part that converts an analog audio signal into a digital signal; a compressing part that compresses the converted digital signal; a modulating part that generates a modulated signal by modulating the compressed processed digital signal; a first all-pass filter that reduces a phase distortion included in the modulated signal; and a transmitting part that transmits a phase-distortion-cancelled signal resulting from reducing the phase distortion of the modulated signal with the first all-pass filter.

A second aspect of the present disclosure provides a receiving apparatus including: a receiving part that receives a modulated signal; a second A/D converting part that converts the modulated signal into a digital signal; a demodulating part that generates a demodulated signal by demodulating the converted digital signal; an expanding part that expands the demodulated signal; a D/A converting part that converts the signal, generated by an expansion performed by the expanding part, into an analog signal; and an output part that outputs the analog signal, wherein the receiving apparatus includes at least one of a second all-pass filter, provided between the second A/D converting part and the demodulating part, to reduce a phase distortion included in the digital signal converted by the second A/D converting part, or a third all-pass filter, provided between the demodulating part and the expanding part, to reduce a phase distortion included in the demodulated signal demodulated by the demodulating part.

A third aspect of the present disclosure provides a transmitting-receiving system including: a transmitting apparatus; and a receiving apparatus that receives a signal transmitted by the transmitting apparatus, wherein the transmitting apparatus has a first A/D converting part that converts an analog audio signal into a digital signal, a compressing part that compresses the converted digital signal, a modulating part that generates a modulated signal by modulating the compressed digital signal, and a transmitting part that transmits the modulated signal, and the receiving apparatus has a receiving part that receives the modulated signal, a second A/D converting part that converts the modulated signal into a digital signal, a demodulating part that generates a demodulated signal by demodulating the digital signal converted by the second A/D converting part, an expanding part that expands the demodulated signal, a D/A converting part that converts the signal, generated by an expansion performed by the extending part, into an analog signal, and an output part that outputs the analog signal, and wherein the transmitting-receiving system includes at least one of a first all-pass filter, provided between the modulating part and the transmitting part, to reduce a phase distortion included in the modulating signal generated by the modulating part, a second all-pass filter, provided between the second A/D converting part and the demodulating part, to reduce a phase distortion included in the digital signal converted by the second A/D converting part, or a third all-pass filter, provided between the demodulating part and the expanding part, to reduce a phase distortion included in the demodulated signal demodulated by the demodulating part.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration Example of a Transmitting Apparatus 100

Figure 1:
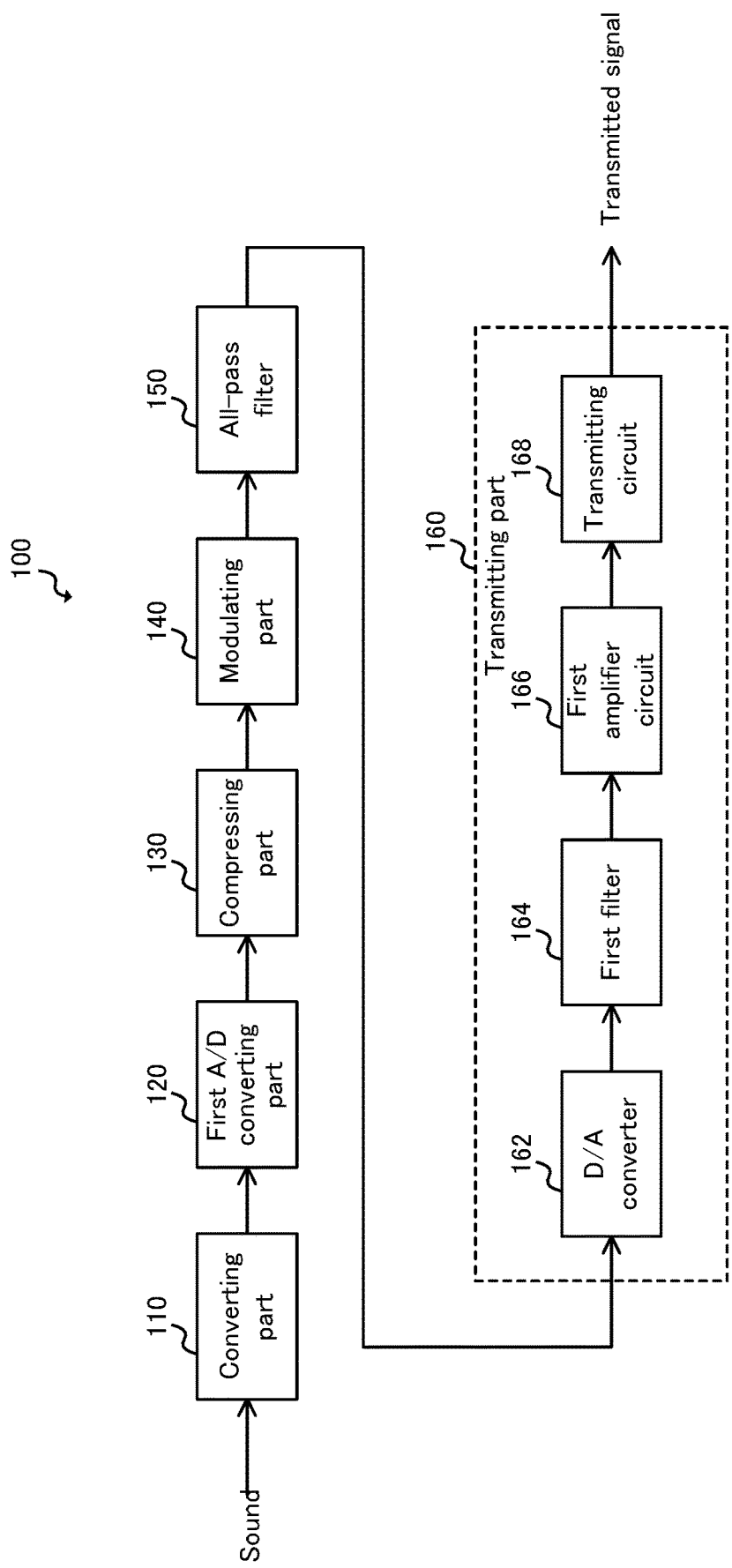
FIG. 1 shows a configuration example of a transmitting apparatus 100 according to the present embodiment.

FIG. 1 shows a configuration example of a transmitting apparatus 100 according to the present embodiment. The transmitting apparatus 100 converts an input sound into an electrical signal, modulates the converted electrical signal, and transmits it to an external device by radio. The transmitting apparatus 100 suppresses non-linearity of a phase of the electrical signal that occurs in modulation with filtering processing. The transmitting apparatus 100 includes a converting part 110, a first A/D converting part 120, a compressing part 130, a modulating part 140, an all-pass filter 150, and a transmitting part 160.

The converting part 110 converts an input sound into an analog audio signal. The converting part 110 converts sound, which transmits as vibration of air, into an electrical signal. The converting part 110 is, for example, a microphone.

The first A/D converting part 120 converts the analog audio signal converted by the converting part 110 into a digital signal. The first A/D converting part 120 has, for example, an A/D converter, and samples the analog audio signal at predetermined intervals. Also, the first A/D converting part 120 may filter the analog audio signal first and then convert it into the digital signal. In this case, the first A/D converting part 120 preferably has a low-pass filter that functions as an anti-aliasing filter.

The compressing part 130 compresses the converted digital signal which the first A/D converting part 120 converted. The compressing part 130 performs the compression using, for example, techniques such as coding, pattern recognition, linear prediction, and the like. Since the compression performed by the compressing part 130 is well known as sound compression, a detailed description thereof is omitted here.

The modulating part 140 generates a modulated signal by modulating the compressed digital signal. The modulating part 140 generates the modulated signal by frequency modulation (FM), for example. Alternatively, the modulating part 140 may generate the modulated signal by amplitude shift keying (ASK) modulation, phase shift keying (PSK) modulation, frequency shift keying (FSK) modulation, or the like.

It is preferable that the modulating part 140 converts a frequency of the compressed digital signal first and then generates the modulated signal. In this case, the modulating part 140 further includes a frequency conversion circuit. The frequency conversion circuit converts the frequency of the compressed digital signal to a higher frequency. The frequency conversion circuit frequency converts the frequency of the compressed digital signal into a frequency of a frequency band transmittable by radio, for example.

Such frequency conversion processing and/or modulation by the modulating part 140 may cause a non-linearity in a phase of the digital signal. Also, an analog circuit, such as an analog filter, may cause non-linearity in a phase of an output signal. Such non-linearity of the phase means degradation of a digital signal prior to compression, and makes it difficult to transmit the audio signal with high accuracy. Therefore, the transmitting apparatus 100 according to the present embodiment corrects such non-linearity with the all-pass filter 150.

The all-pass filter 150 reduces a phase distortion included in the modulated signal which the modulating part 140 generated. The all-pass filter 150 has characteristics of a transfer function H(s) having an absolute value of 1, such as the following equation:

$$H(s) = \frac{s^2 - \frac{\omega_0}{Q}s + \omega_0^2}{s^2 + \frac{\omega_0}{Q}s + \omega_0^2}. \quad (1)$$

Here, it is assumed that a cutoff frequency is $F_0$, $\omega_0 = 2\pi F_0$, and a Q-factor is Q.

The transfer function H(s) of the all-pass filter 150 expressed by Equation 1 indicates a second-order transfer function, but the all-pass filter 150 may have characteristics of a higher-order transfer function. A filter coefficient of the all-pass filter 150 is preferably determined in advance according to characteristics of the modulating part 140. Such an all-pass filter 150 can correct a non-linear phase of the modulated signal to bring it close to a linear phase.

The transmitting part 160 transmits, to an external device, a phase-distortion-cancelled signal resulting from reducing the phase distortion of the modulated signal with the all-pass filter 150. The transmitting part 160 converts the phase-distortion-cancelled signal into an analog signal first and then transmits it. The transmitting part 160 includes, for example, a D/A converter 162, a first filter 164, a first amplifier circuit 166, and a transmitting circuit 168.

The D/A converter 162 converts the phase-distortion-cancelled signal into the analog signal. The first filter 164 passes analog signal components of a predetermined band within the analog signal converted by the D/A converter 162. The first filter 164 passes analog signal components of a band including information of sound input to the converting part 110, for example. The first filter 164 is, for example, the low-pass filter, and functions as the anti-aliasing filter.

The first amplifier circuit 166 amplifies the analog signal components which the first filter 164 has passed through. The transmitting circuit 168 transmits a signal which the first amplifier circuit 166 amplified to an external device. The transmitting circuit 168 includes an LED, for example, and transmits a signal which is the amplified signal amplified by the first amplifier circuit 166 and converted into an optical signal to an external device, as a transmitted signal. In this case, a wavelength of the optical signal is, for example, the wavelength in the infrared region. Alternatively, the transmitting circuit 168 has an antenna, and may transmit a signal which is the amplified signal amplified by the first amplifier circuit 166 and converted into a radio signal, as a transmitted signal.

As described above, the transmitting apparatus 100 according to the present embodiment transmits, to an external device, the phase-distortion-cancelled signal which is the modulated signal whose non-linear phase has been corrected to a linear phase by the all-pass filter 150. Therefore, a receiving apparatus that received the transmitted signal transmitted by the transmitting apparatus 100 can restore the audio signal whose phase distortion has been suppressed by performing expansion on the received signal.

Example of Results of a Phase Correction

Figure 2:
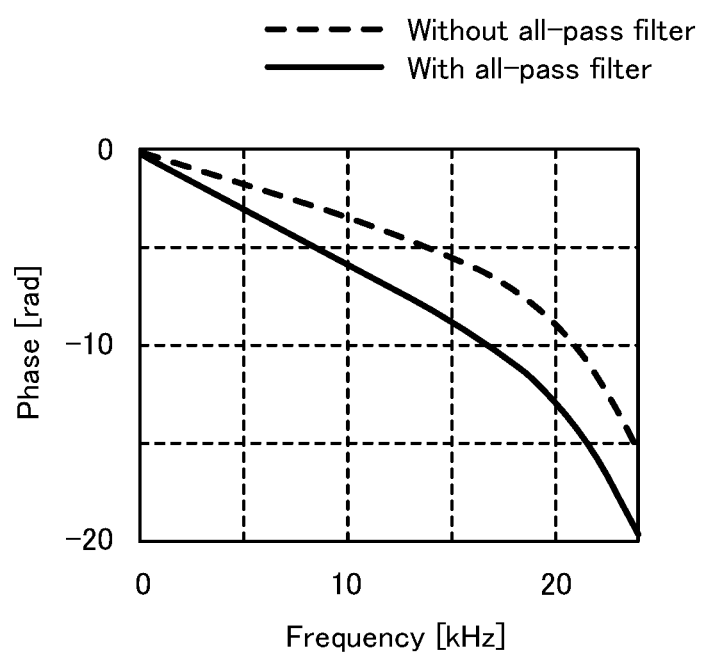
FIG. 2 shows an example of results of a phase correction using an all-pass filter 150 according to the present embodiment.

FIG. 2 shows an example of results of a phase correction by the all-pass filter 150 according to the present embodiment. The horizontal axis of FIG. 2 indicates the frequency, and the vertical axis indicates the phase of a signal. In FIG. 2, the broken line indicates frequency characteristics of a signal having a non-linear phase. In other words, the broken line is an example of a transmitted signal output from a transmitting apparatus without the all-pass filter 150.

In contrast, the solid line indicates frequency characteristics of the signal having a non-linear phase that has passed through the all-pass filter 150. In other words, the solid line is an example of a transmitted signal output from the transmitting apparatus 100 having the all-pass filter 150. Compared to a waveform indicated by the broken line, the frequency band where the frequency characteristics of phase become linear is expanded in the waveform indicated with the solid line. In this manner, the all-pass filter 150 can correct the non-linear phase of the modulated signal to the linear phase.

The all-pass filter 150 may be provided on a transmission line for the digital signal, and it is preferable that the all-pass filter 150 is provided on the output stage side of the transmission line for the digital signal. For example, it is more preferable that the all-pass filter 150 is provided at the very end of the transmission line for the digital signal, such as immediately before the D/A converter 162 of the transmitting part 160*m*, as shown in the example of FIG. 1.

It should be noted that, instead of or in addition to the transmitting apparatus 100, a receiving apparatus may have the function of correcting such a non-linear phase to be a linear phase. Next, a receiving apparatus having a correction function will be described.

Configuration Example of a Receiving Apparatus 200

Figure 3:
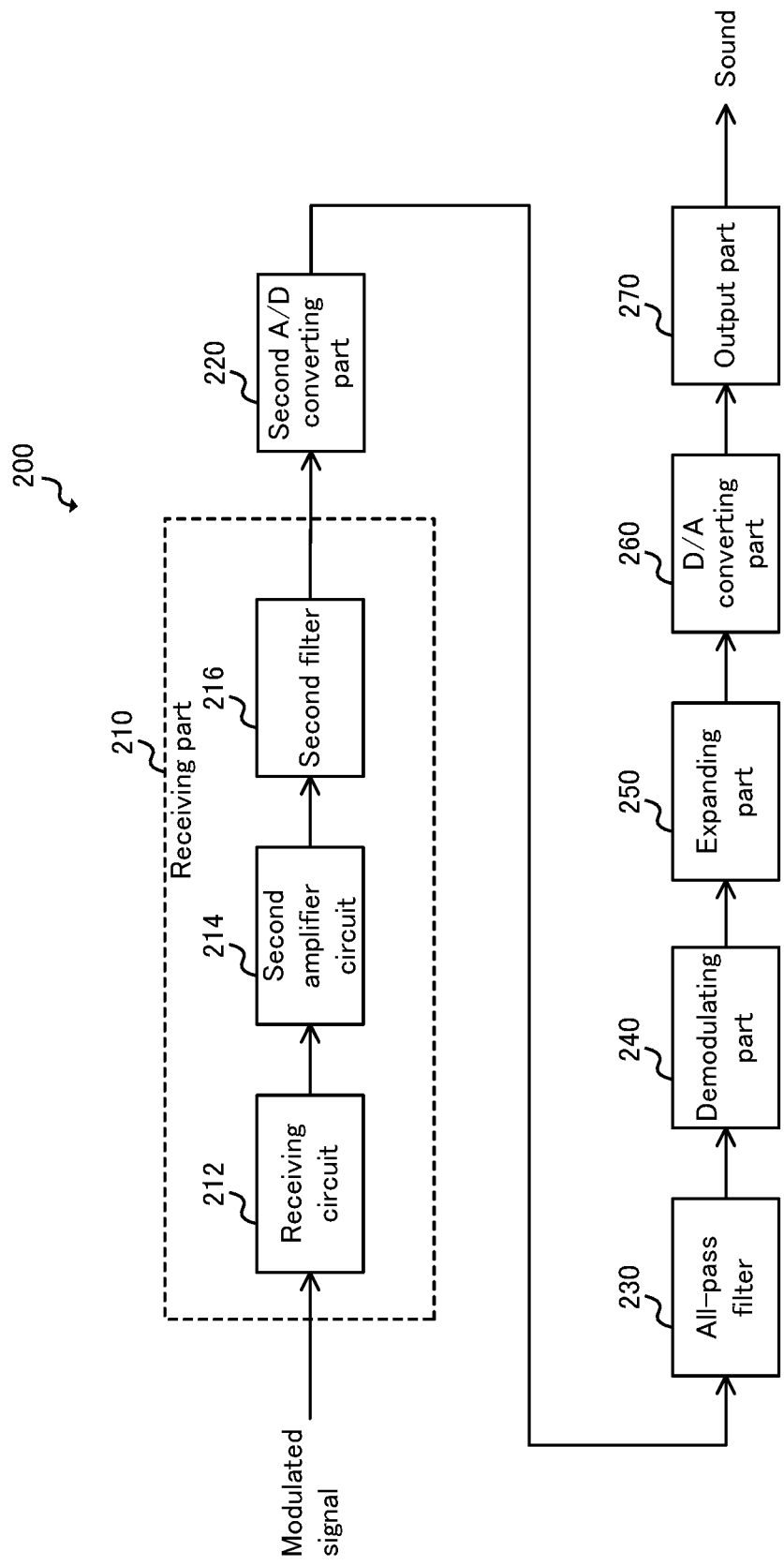
FIG. 3 shows a configuration example of a receiving apparatus 200 according to the present embodiment.

FIG. 3 shows a configuration example of a receiving apparatus 200 according to the present embodiment. The receiving apparatus 200 receives a modulated audio signal and restores the audio signal by first demodulating the modulated audio signal and then expanding the demodulated audio signal. The receiving apparatus 200 uses filtering processing to suppress non-linearity of a phase of an electrical signal that occurs in modulation and/or demodulation. The receiving apparatus 200 includes a receiving part 210, a second A/D converting part 220, an all-pass filter 230, a demodulating part 240, an expanding part 250, a D/A converting part 260, and an output part 270.

The receiving part 210 receives the modulated signal. The receiving part 210 receives, for example, a modulated signal modulated using frequency modulation. Alternatively, the receiving part 210 may receive a signal modulated using amplitude shift keying, phase shift keying, frequency shift keying, or the like. The receiving part 210 receives, for example, the modulated signal in which non-linearity has occurred in the phase due to modulation. In this embodiment, an example in which the receiving part 210 receives an optical signal that has a wavelength in the infrared region and has been modulated will be described. The receiving part 210 includes, for example, a receiving circuit 212, a second amplifier circuit 214, and a second filter 216.

The receiving circuit 212 converts the modulated optical signal into an electrical signal. The receiving circuit 212 has, for example, a photodiode capable of receiving light in the infrared region. Further, when the modulated signal is a radio wave, the receiving circuit 212 has an antenna, and converts the radio wave into the electrical signal.

The second amplifier circuit 214 amplifies the electrical signal which the receiving circuit 212 converted. The second filter 216 passes analog signal components of a predetermined band of the electrical signal amplified by the second amplifier circuit 214. The second filter 216 passes, for example, analog signal components in a band including information to be converted into an audio signal by the receiving apparatus 200 at the output stage. The second filter 216 is, for example, the low-pass filter, and functions as the anti-aliasing filter.

The second A/D converting part 220 converts the modulated signal received by the receiving part 210 into a digital signal. The second A/D converting part 220 converts the analog signal components which the second filter 216 passed into the digital signal.

It should be noted that since the above-described frequency conversion processing and/or modulation has been applied to the modulated signal received by the receiving part 210, there may be a case where the phase of the modulated signal has non-linearity. In such a case, if the modulated signal is converted into an audio signal, the sound may be degraded. Therefore, the receiving apparatus 200 according to the present embodiment corrects such non-linearity with the all-pass filter 230.

The all-pass filter 230 reduces the phase distortion included in the digital signal converted by the second A/D converting part 220. The all-pass filter 230 has characteristics of the transfer function H(s) whose absolute value is 1, as expressed by Equation 1, for example. The all-pass filter 230 has characteristics of (i) the second order transfer function or (ii) the third order or higher order transfer functions. The all-pass filter 230 can correct the non-linear phase of the modulated signal to bring it close to the linear phase. The all-pass filter 230 outputs, as the phase-distortion-cancelled signal, a signal in which the phase distortion of the digital signal converted from the modulated signal had been reduced.

The demodulating part 240 demodulates the phase-distortion-cancelled signal, resulting from reducing the phase distortion of the digital signal, with the all-pass filter 230 to generate a demodulated signal. For example, when the modulated signal received by the receiving part 210 is generated using frequency modulation, the demodulating part 240 FM-demodulates the phase-distortion-cancelled signal. Further, when the modulated signal is frequency-converted, the demodulating part 240 converts the frequency to the original frequency.

It should be noted that the frequency conversion processing and/or the demodulation by the demodulating part 240 may also cause non-linearity in the phase of the digital signal. Therefore, the all-pass filter 230 may output a phase-distortion-cancelled signal in which the non-linearity that occurs in the demodulating part 240 is corrected inclusively. In this case, it is preferable that parameters of the all-pass filter 230 are predetermined so that two phase distortions are corrected on the basis of both (i) the phase distortion that occurs in the demodulating part 240 and (ii) the phase distortion of the modulated signal received by the receiving part 210, which are measured in advance. By doing this, even though the demodulating part 240 causes the non-linearity to occur, the demodulating part 240 can output the demodulated signal which has been corrected to be close to a linear phase.

The expanding part 250 expands the demodulated signal demodulated by the demodulating part 240. The expanding part 250 applies, to the demodulated signal, an expansion corresponding to the compression that has been applied to the modulated signal received by receiving part 210. Since the expansion which the expanding part 250 executes is similarly known as sound compression, detailed description thereof is omitted here.

The D/A converting part 260 converts the signal, generated by an expansion performed by the expanding part 250, into an analog signal. The D/A converting part 260 includes, for example, a D/A converter. The D/A converting part 260 may also filter the converted analog signal. In this case, it is preferable that the D/A converting part 260 has the low-pass filter that functions as the anti-aliasing filter.

The output part 270 outputs the analog signal converted by the D/A converting part 260. The output part 270 outputs the analog signal by converting it into sound which is transmitted as vibration of air, for example. The output part 270 is, for example, a speaker, an earphone, or the like.

As described above, in the receiving apparatus 200 according to the present embodiment, the all-pass filter 230 corrects the non-linear phase of the modulated signal to be a linear phase. As a result, even if phase distortion has occurred in the received modulated signal, the receiving apparatus 200 can restore the audio signal with suppressed phase distortion. Also, the all-pass filter 230 can correct the non-linear phase that occurs in the demodulating part 240 to be a linear phase. Therefore, even if phase distortion occurs in the demodulation, the receiving apparatus 200 can restore the audio signal with suppressed phase distortion.

In this embodiment described above, the example where the receiving apparatus 200 receives the modulated signal having the non-linear phase has been described. In this case, the receiving apparatus 200 forms a transmitting-receiving system together with a transmitting apparatus that does not have the all-pass filter 150, but is not limited thereto. The receiving apparatus 200 may receive, as the modulated signal, the transmitted signal transmitted by the transmitting apparatus 100 described in FIG. 1. In this case, the transmitting apparatus 100 and the receiving apparatus 200 form the transmitting-receiving system.

In such a transmitting-receiving system, the phase of the modulated signal received by the receiving apparatus 200 is approximately linear in phase. Therefore, a filter coefficient of the all-pass filter 230 may be set to correct the non-linear phase that occurs in the demodulating part 240 to be a linear phase. By doing this, the transmitting-receiving system can accurately propagate and restore an audio signal because the phase distortion that occurs in a process of modulating the transmitted signal is suppressed by the transmitting apparatus 100, and the phase distortion that occurs in a process of demodulating the received signal is suppressed by the receiving apparatus 200.

In the description of the receiving apparatus 200 according to the present embodiment described above, the example in which the all-pass filter 230 is provided between the second A/D converting part 220 and the demodulating part 240 has been shown, but the receiving apparatus 200 is not limited thereto. The all-pass filter 230 may be provided, for example, between the demodulating part 240 and the expanding part 250. As described above, it is more preferable that the all-pass filter 230 is provided at the output stage of a part where the non-linearity occurs.

In this case, the demodulating part 240 demodulates the digital signal converted by the second A/D converting part 220 to generate a demodulated signal. Then, the all-pass filter 230 reduces the phase distortion included in the demodulated signal demodulated by the demodulating part 240. The expanding part 250 expands the phase-distortion-cancelled signal resulting from reducing the phase distortion with the all-pass filter 230. Even in such a configuration, the receiving apparatus 200 can restore the audio signal with suppressed phase distortion by correcting the modulated signal having the non-linear phase. Further, even if phase distortion occurs in the demodulation, the receiving apparatus 200 can restore the audio signal with suppressed phase distortion.

The example in which one all-pass filter is provided in the transmitting apparatus 100 and/or the receiving apparatus 200 has been described in the transmitting and receiving system according to the present embodiment, but the present disclosure is not limited to this. For example, a plurality of all-pass filters 150 may be provided in the transmitting apparatus 100. Similarly, a plurality of all-pass filters 230 may be provided in the receiving apparatus 200.

The transmitting-receiving system according to the present embodiment can transmit sound by radio and restore the input sound at a position away from the position where sound was input. Such a transmitting-receiving system can function, for example, as a karaoke machine, a conferencing system, a live audio transmission system, or the like.

It is preferable that at least a part of the transmitting-receiving systems according to the above embodiment is formed by an integrated circuit or the like. For example, the transmitting-receiving system may include a field programmable gate array (FPGA), a digital signal processor (DSP), and/or a central processing unit (CPU).

When at least a part of the transmitting-receiving system is formed by a computer or the like, the transmitting-receiving system includes a storage unit. The storage unit includes, for example, a read only memory (ROM) storing a basic input output system (BIOS) or the like of the computer or the like that realizes the audio signal processing apparatus 10, and a random access memory (RAM) serving as a work area. Also, the storage unit may store various pieces of information including an operating system (OS), application programs, and/or a database that is referenced when executing the application programs. That is, the storage unit may include a large capacity apparatus like a hard disk drive (HDD) and/or a solid state drive (SSD). The processors such as the CPU and the like function as the transmitting-receiving system by executing programs stored in the storage unit.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured to be functionally or physically distributed and integrated in arbitrary units. Further, new exemplary embodiments generated by arbitrary combinations of them are included in the exemplary embodiments of the present disclosure. The effect of the new embodiment caused by the combination has the effect of the original embodiment together.

What is claimed is:

1. A transmitting apparatus comprising:
   a first A/D converting part that converts an analog audio signal into a digital signal;
   a compressing part that compresses the converted digital signal;
   a modulating part that generates a modulated signal by modulating the compressed digital signal;
   a first all-pass filter that reduces a phase distortion included in the modulated signal; and
   a transmitting part that transmits a phase-distortion-cancelled signal resulting from reducing the phase distortion of the modulated signal with the first all-pass filter.

2. The transmitting apparatus according to claim 1, further comprising
   a converting part that converts an input sound into the analog audio signal.

3. The transmitting apparatus according to claim 1, wherein the first all-pass filter has characteristics of a transfer function H(s) having an absolute value of 1, such as the following equation:

$$H(s) = \frac{s^2 - \frac{\omega_0}{Q}s + \omega_0^2}{s^2 + \frac{\omega_0}{Q}s + \omega_0^2} \quad (1)$$

where a cutoff frequency is $F_0$, $\omega_0 = 2\pi F_0$, and a Q factor is Q.

4. A receiving apparatus comprising:
a receiving part that receives a modulated signal;
a second A/D converting part that converts the modulated signal into a digital signal;
a demodulating part that generates a demodulated signal by demodulating the converted digital signal;
an expanding part that expands the demodulated signal;
a D/A converting part that converts the signal, generated by an expansion performed by the expanding part, into an analog signal; and
an output part that outputs the analog signal, wherein the receiving apparatus comprises at least one of a second all-pass filter, provided between the second A/D converting part and the demodulating part, to reduce a phase distortion included in the digital signal converted by the second A/D converting part, or a third all-pass filter, provided between the demodulating part and the expanding part, to reduce a phase distortion included in the demodulated signal demodulated by the demodulating part.

5. The receiving apparatus according to claim 4, wherein at least one of the second all-pass filter or the third all-pass filter has characteristics of a transfer function H(s) having an absolute value of 1, such as the following equation:

$$H(s) = \frac{s^2 - \frac{\omega_0}{Q}s + \omega_0^2}{s^2 + \frac{\omega_0}{Q}s + \omega_0^2} \quad (2)$$

where a cutoff frequency is $F_0$, $\omega_0 = 2\pi F_0$, and Q factor is Q.

6. A transmitting-receiving system comprising:
a transmitting apparatus; and
a receiving apparatus that receives a signal transmitted by the transmitting apparatus, wherein
the transmitting apparatus has
a first A/D converting part that converts an analog audio signal into a digital signal,
a compressing part that compresses the converted digital signal,
a modulating part that generates a modulated signal by modulating the compressed digital signal, and
a transmitting part that transmits the modulated signal, and
the receiving apparatus has
a receiving part that receives the modulated signal,
a second A/D converting part that converts the modulated signal into a digital signal,
a demodulating part that generates a demodulated signal by demodulating the digital signal converted by the second A/D converting part,
an expanding part that expands the demodulated signal,
a D/A converting part that converts the signal, generated by an expansion performed by the extending part, into an analog signal, and
an output part that outputs the analog signal, and
wherein the transmitting-receiving system comprises at least one of a first all-pass filter provided, between the modulating part and the transmitting part, to reduce a phase distortion included in the modulating signal generated by the modulating part, a second all-pass filter, provided between the second A/D converting part and the demodulating part, to reduce a phase distortion included in the digital signal converted by the second A/D converting part, or a third all-pass filter, provided between the demodulating part and the expanding part, to reduce a phase distortion included in the demodulated signal demodulated by the demodulating part.

7. The transmitting-receiving system according to claim 6, wherein the transmitting apparatus further comprises a converting part that converts an input sound into the analog audio signal.

8. The transmitting-receiving system according to claim 6, wherein at least one of the first all-pass filter, the second all-pass filter, or the third all-pass filter has characteristics of a transfer function H(s) having an absolute value of 1, such as the following equation:

$$H(s) = \frac{s^2 - \frac{\omega_0}{Q}s + \omega_0^2}{s^2 + \frac{\omega_0}{Q}s + \omega_0^2} \quad (3)$$

where a cutoff frequency is $F_0$, $\omega_0 = 2\pi F_0$, and a Q factor is Q.

* * * * *